(12) United States Patent
Terry, III et al.

(10) Patent No.: US 7,926,510 B1
(45) Date of Patent: Apr. 19, 2011

(54) RISERS FOR USE WITH ACCESS OPENINGS IN WASTEWATER TREATMENT TANKS

(75) Inventors: Theophilus B. Terry, III, Somerville, TN (US); Thomas N. Jenkins, Louisville, KY (US)

(73) Assignee: EZflow L.P., Old Saybrook, CT (US)

( * ) Notice: Subject to any disclaimer, the term of this patent is extended or adjusted under 35 U.S.C. 154(b) by 0 days.

(21) Appl. No.: 12/235,910

(22) Filed: Sep. 23, 2008

Related U.S. Application Data

(63) Continuation of application No. 11/063,925, filed on Feb. 23, 2005, now abandoned.

(51) Int. Cl.
*F16L 5/00* (2006.01)
(52) U.S. Cl. ............ 137/363; 137/584; 52/20; 405/133; 405/134
(58) Field of Classification Search .................. 137/590, 137/363, 583, 584, 370; 52/20, 79.9; 220/4.08, 220/4.26; 405/133, 134, 41
See application file for complete search history.

(56) References Cited

U.S. PATENT DOCUMENTS

| 211,164 | A | 1/1879 | Klein |
| 4,102,088 | A | 7/1978 | Keller et al. |
| 4,434,903 | A | 3/1984 | Cooke |
| 5,386,669 | A | 2/1995 | Almeida |
| 5,617,679 | A | 4/1997 | Meyers |
| 5,852,901 | A | 12/1998 | Meyers |
| 5,975,116 | A | 11/1999 | Rosas et al. |
| 6,047,724 | A | 4/2000 | Nurse, Jr. |
| 6,655,093 | B1 | 12/2003 | Gavin |
| 6,688,072 | B1 | 2/2004 | Gavin |
| 2003/0145527 | A1 | 8/2003 | Meyers |

*Primary Examiner* — Stephen M Hepperle
*Assistant Examiner* — Andrew J Rost
(74) *Attorney, Agent, or Firm* — C. Nessler (57) ABSTRACT

A riser system for use at the access opening of a wastewater treatment tank includes an adaptor ring affixed to the top of the tank, and a mating riser. The adaptor ring and riser have ends with mating circumferential L-shape sections. There are horizontally projecting tabs spaced apart around the upper end of the adaptor. The tabs engage a corresponding number of L-shape slots which are spaced apart around the circumference of the bottom end of the riser. When ring and riser are mated, rotation of the riser relative to the adaptor causes each tab to move circumferentially to a recess in the slot, which locks the tab in position. Micro-ridges on horizontal mating surfaces of the L-shape sections help form a seal between the two parts.

8 Claims, 8 Drawing Sheets

RISERS FOR USE WITH ACCESS OPENINGS IN WASTEWATER TREATMENT TANKS

CROSS REFERENCE TO RELATED APPLICATIONS

This application is a continuation of U.S. patent application Ser. No. 11/063,925, filed Feb. 23, 2005, the contents of which are incorporated herein in its entirety.

BACKGROUND OF THE INVENTION

This invention relates to risers for wastewater treatment tanks and more particularly relates to connecting attachments for a plurality of risers for an access opening.

In water treatment facilities, in particularly sewage treatment or septic tanks, it is common practice to manufacture tanks with top openings which are used for access to the tanks for cleaning, including the pumping out of the insides, repairing or replacing of filter elements and the like. Moreover, there are no standard dimensions for septic tanks openings or are there standard distances from the ground surface to the top of the tank when the tank is installed in the ground. Thus, manufacturers and users of septic tanks are presented with a number of problems in dealing with access to a septic tank. For example, since the access openings into the concrete tanks may be several inches or feet from the surface, risers which are adaptable to connect with the opening to provide vertical access to the surface are required. Furthermore, it is generally necessary to provide a plurality of risers stacked in a vertical condition.

SUMMARY OF THE INVENTION

It is an object of the present invention to provide a riser between a top access opening in a wastewater treatment tank and the ground surface when the tank top is disposed below the ground surface.

It is another object of the present invention to provide risers with connecting or attaching means so a plurality of risers may be stacked to accommodate the space between a top entering access opening in a septic tank and the ground surface thereabove.

More particularly, the present invention provides a riser for an access opening to a tank wherein the riser includes a top portion and an integral bottom portion with a longitudinally extending opening therethrough. The top portion is provided with a downwardly extending upper side wall portion with an L-shaped upper edge. The L-shaped upper edge includes an inner surface with at least one locking tab thereon. The bottom portion is provided with an upwardly extending lower side wall portion with an inverted L-shaped lower edge. The inverted L-shaped lower edge includes at least one mating slot therein mateable with the locking tab. A middle side wall portion connects the top portion to the bottom portion.

Even more particularly, the present invention provides an adaptor ring for connecting a riser to an opening in a tank which includes a top portion and an integral bottom portion with a longitudinally extending opening therethrough. The bottom portion is provided with an outwardly extending flange wherein the flange has an upper surface and a lower surface. The upper surface includes a plurality of ribs and a plurality of re-bar receiving channels circumferentially spaced therearound. The lower surface is provided with a plurality of circular spaced sealing grooves therealong for attachment to an in-place access opening flange of a tank.

BRIEF DESCRIPTION OF THE DRAWINGS

A better understanding of the invention will be had upon reference to the following description in conjunction with the accompanying drawings in which like numerals refer to like parts throughout the several views and wherein.

DETAILED DESCRIPTION OF THE PREFERRED EMBODIMENTS

Figure 1:
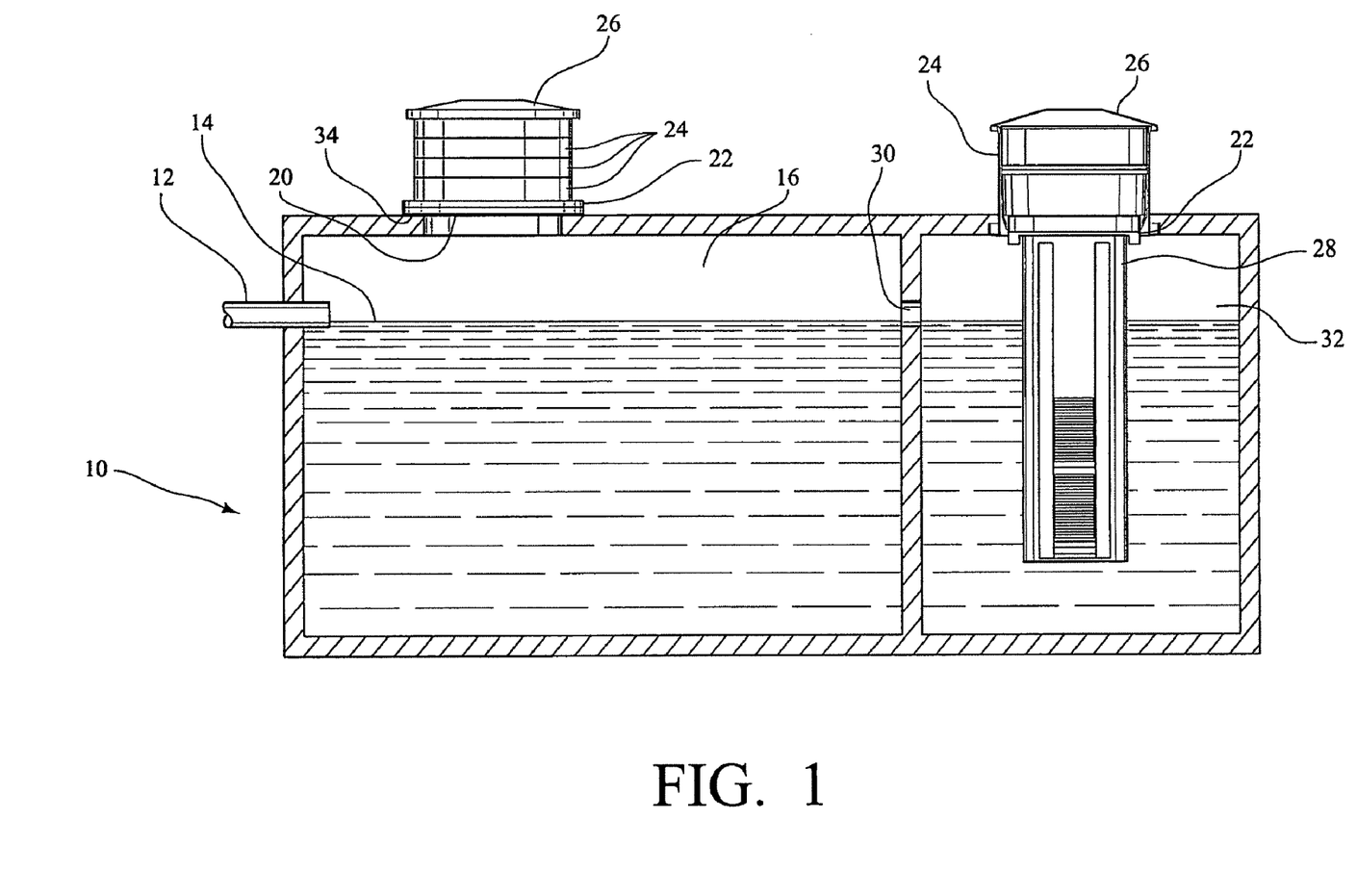
FIG. 1 is a cross-sectional elevational view of one example showing risers and adaptor rings within the scope of the present invention in a septic tank in a sewage treatment application.

With reference to FIG. 1, there is shown a septic tank 10 in a sewage treatment application. Liquid to be treated is admitted into the tank 10 through an inlet 12. A level 14 of the liquid is maintained in the tank 10 and the liquid to be treated which enters through inlet 12 is allowed to settle in a settling compartment 16. The liquid then overflows into an overflow compartment 32 through the flow through opening 30. Even though the septic tank 10 is shown with two compartments, a settling compartment 16 and an overflow compartment 32, the liquid in the tank 10 may be subjected to many different types of treatment in the septic tank, such as, bacterial degradation processes, filtration, and the like. Moreover, only one compartment with only one access opening may be used or a plurality of compartments with a plurality of access openings may be used. For example in FIG. 1 a pump vault 28 including a filtering element therein (not shown) is held in place by a tank adaptor ring 22. The tank adaptor ring which sets below the ground surface is provided with at least one riser 24 to increase the vertical height of the opening to the overflow compartment 32 and a tank opening cover 26 is mounted upon and attached to the riser 24.

Also as shown in FIG. 1, the settling compartment 16 is provided with an access opening 20 which includes a tank adaptor ring 22 mounted thereon and a plurality of risers 24, which increases the vertical height of the opening, and a tank opening cover 26 is disposed at or above the ground surface. A cast-in place ring 34 circumscribes the opening 20 into the settling compartment 16.

Figure 2A:
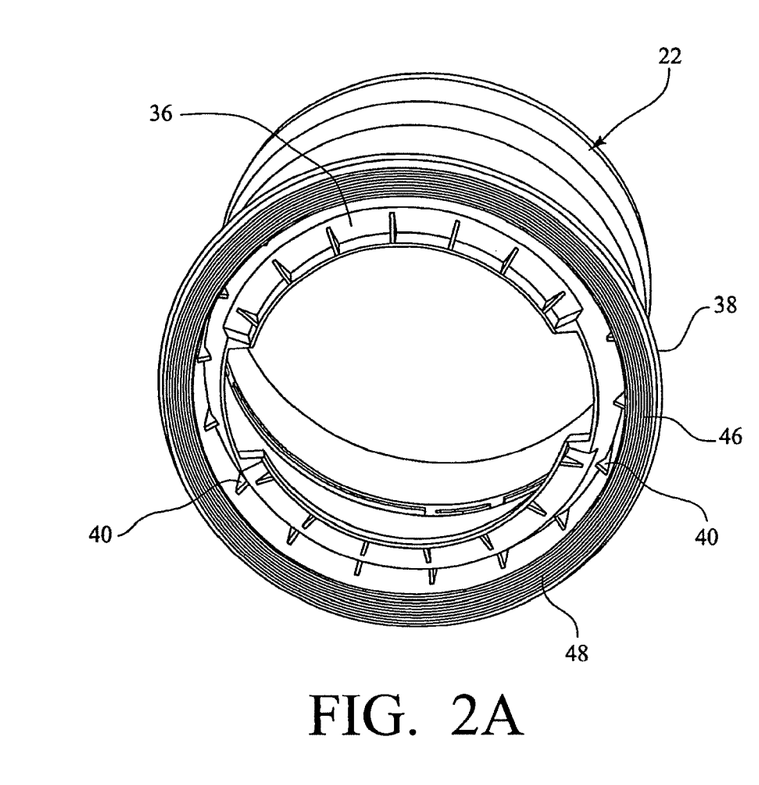
FIG. 2A is a bottom perspective view of an adaptor ring of the present invention.

Referring now to FIG. 2A, the tank adaptor ring 22 is provided with an outwardly extending flange portion 38 including a bottom surface 46. The bottom surface 46 is provided with a plurality of circumferentially extending grooves 48 which are adapted for mating with an in-place access tank opening ring 34 as shown in FIG. 1. The ring 34 is encased within the concrete in the initial pouring of the concrete for the septic tank. This keeps the ring 34, which receives a lid 26 or the like, anchored so that it cannot pull out from the concrete upon removal of the lid 26. The adaptor ring 22 including the grooves 48 in the bottom surface 46 is generally filled with an adhesive material which facilitates in securing of the retainer adaptor ring 22 to the ring 34 embedded in the concrete.

Figure 2B:
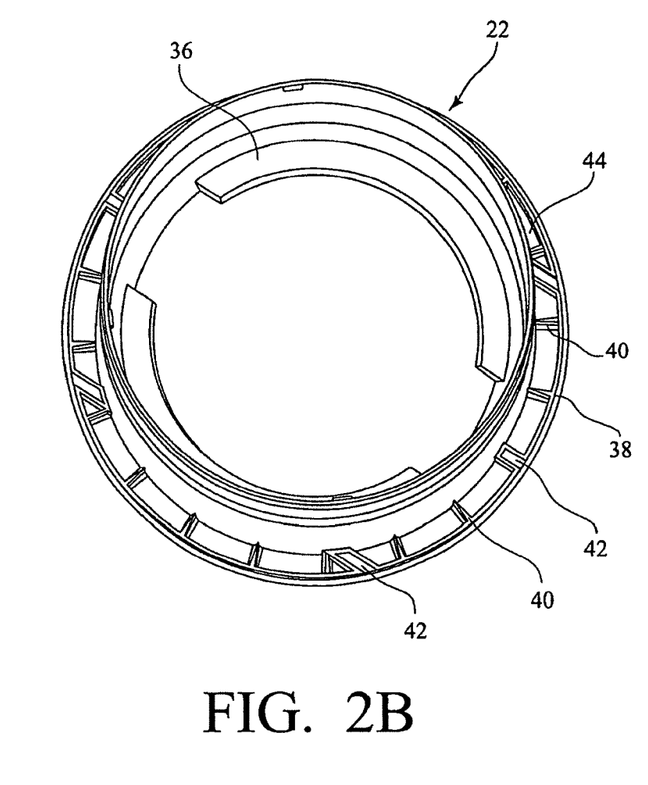
FIG. 2B is a top perspective view of the adaptor ring of FIG. 2A.

As shown in FIG. 2B the adaptor ring 22 is provided with a top surface 44 which is adaptable for use in the original construction of an access opening into a septic tank. The upper surface 44 of the flange 38 is provided with re-enforcing ribs 40 as well as channels 42 for receipt of re-bar 50, as shown in FIG. 3, for the receipt of concrete therearound in the initial pouring for a septic tank or the concrete formation of the access opening of a septic tank.

Figure 3:
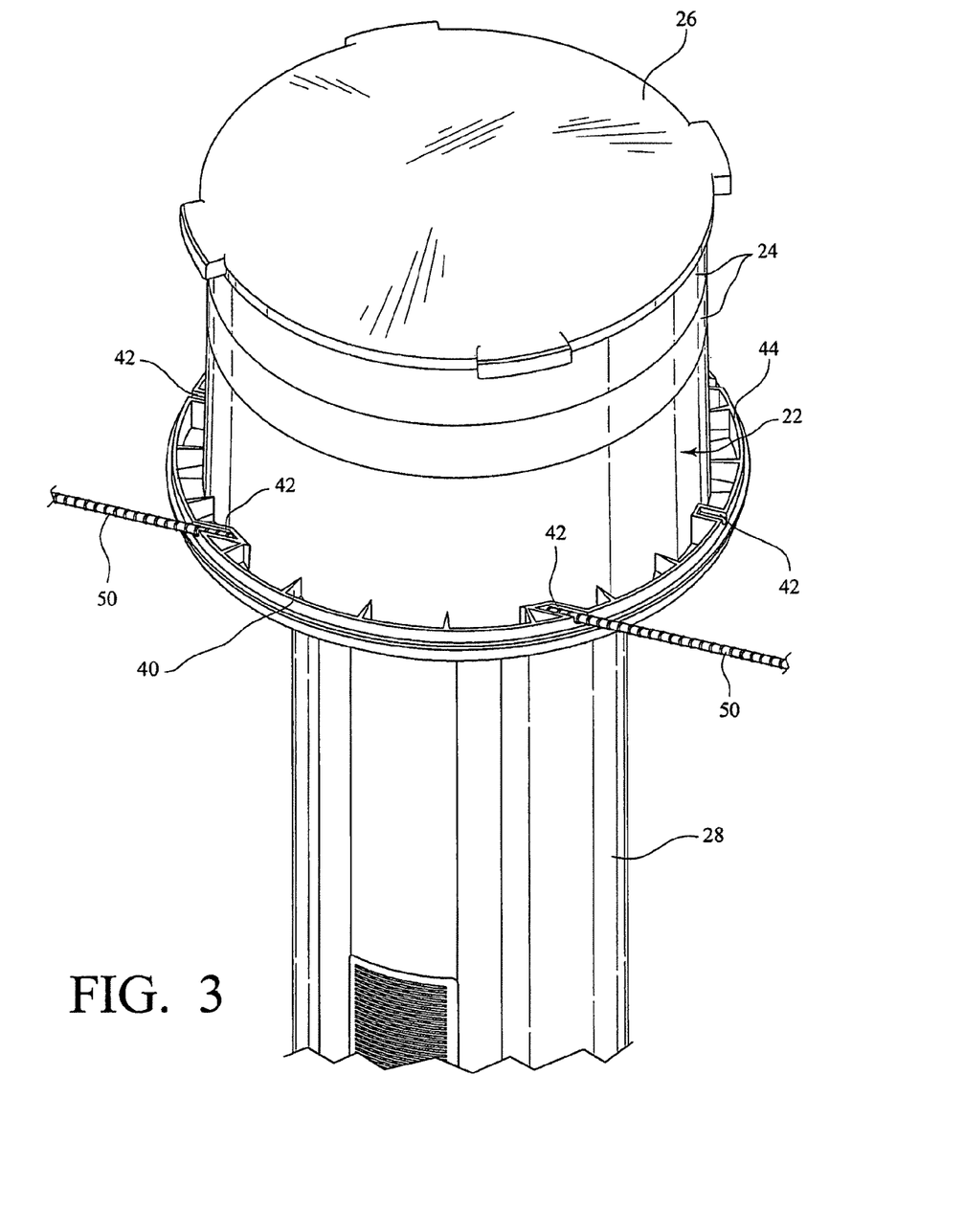
FIG. 3 is a perspective view of an adaptor ring showing the upper surface of the adaptor ring and in connection with a riser of the present invention.
Figure 4:
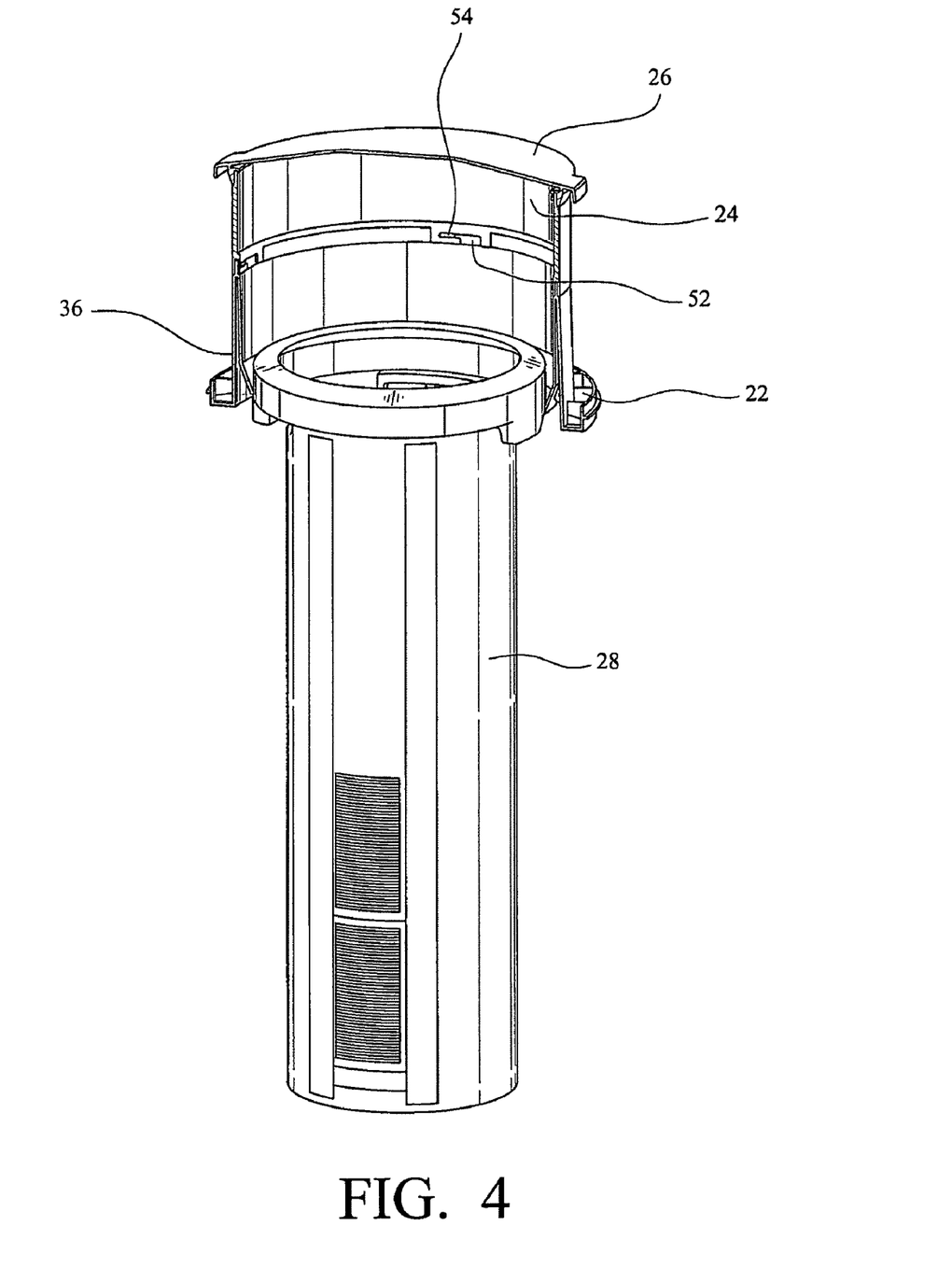
FIG. 4 is a perspective view with selected portions cutaway of the adaptor ring and riser showing the connecting device of the present invention.

As shown in FIGS. 3 & 4, the tank adaptor ring 22 is provided with a pump vault retention collar 36 for the mounting of a pump vault 28 thereon which generally includes a filter (not shown) as well as a pump (not shown) therein. The septic tank adaptor ring 22 is provided with an upper portion which includes a plurality of locking tabs 54 spaced at preselected positions around the inner surface of the upper edge of the adaptor ring 22 for mating with a mating slot 52 of a riser 24.

FIGS. 5A, 6A, 6B, and 7 best show a preferred locking arrangement for the vertical stacking and locking of risers. As shown, the adaptor ring 22 includes a top portion having a downwardly extending upper side wall portion with an L-shaped upper edge 58. An inner surface of the L-shaped upper edge 58 includes a plurality of spaced locking tabs 54 circumferentially selected and spaced along the entire top portion. See FIG. 5A, 6A, 6C. The L-shaped upper edge 58 is provided with a vertical wall 65 having an outer surface 66 and a horizontally (circumferentially) extending surface 64 at the lower end of surface 66 for mating with a bottom portion of the riser 24, namely the inverted L-shaped lower edge 56 of an riser 24 which is shown mounted on the adapter in FIG. 5A. The bottom portion of riser 24 has an inverted L-shaped lower edge 56 and a vertical wall 61 having an inner vertical surface 62 and a horizontal surface 60. The vertical surface 62 generally has the same length as a vertical surface 66. And the thickness of the vertical portion 65 of the lower edge 56 is of substantially the same thickness as the horizontal surface 64 of the upper edge 58. The vertical wall 65 has a top horizontal surface 70 which is the same thickness as the horizontal surface 60 so that in a stacked condition surface 70 mates with surface 60 and the outer surface 66 of the vertical wall 65 is in contacting relation with the inner surface 62 of the vertical wall 61.

Figure 5A:
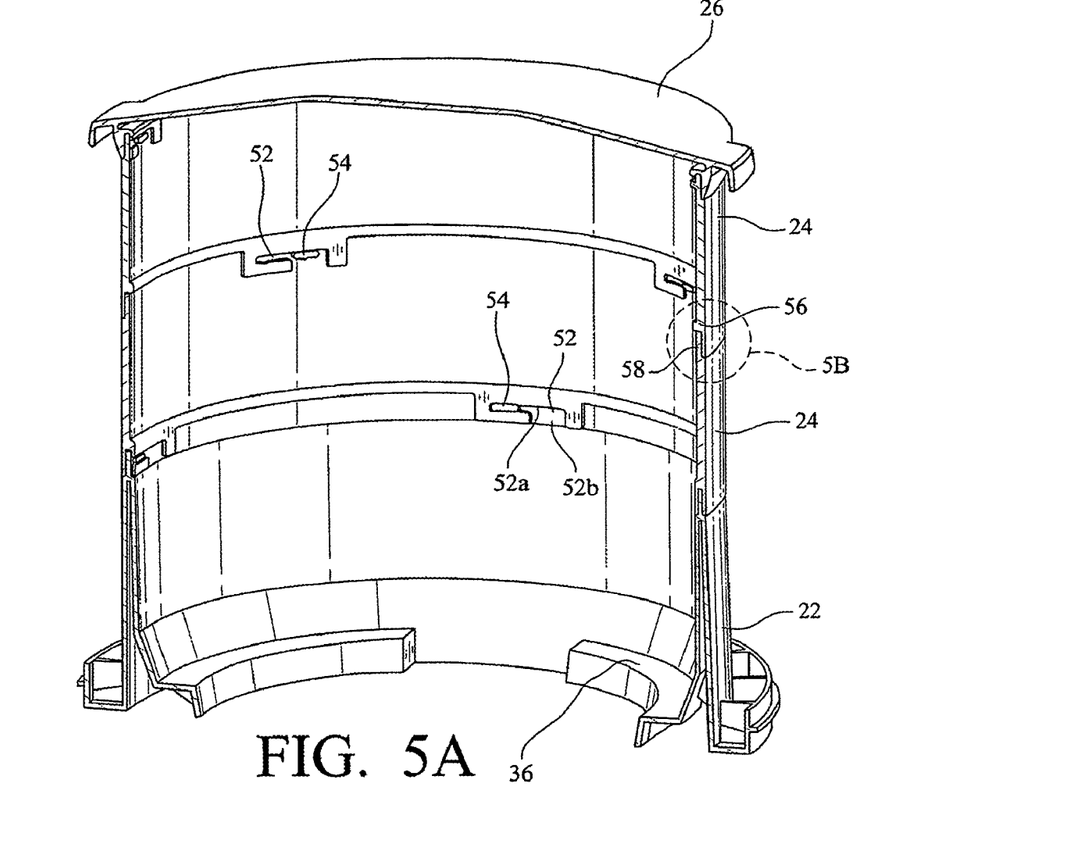
FIG. 5A is a perspective view with selected portions cutaway of a plurality of risers of the present invention shown in a vertical connecting arrangement.
Figure 5B:
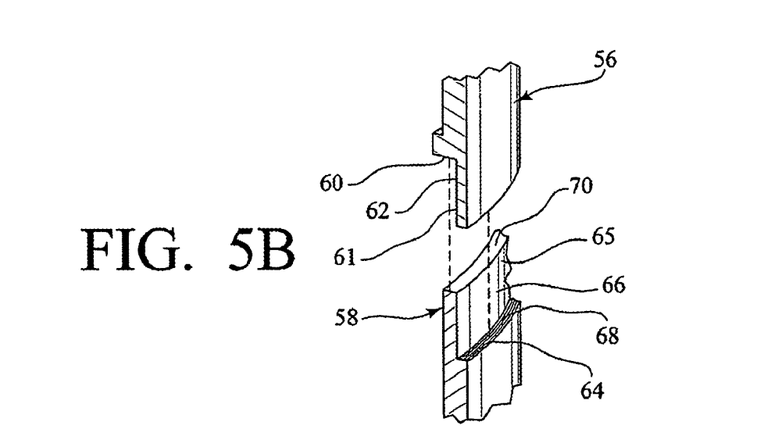
FIG. 5B is a cross-sectional view of the risers of FIG. 5A taken through a plane passing through line 5B-5B of FIG. 5A.

As best shown in FIG. 5B a plurality of grooves with micro-ridges 68 are disposed along the horizontal surface 64 of the upper edge 58 for engaging with the lowermost horizontal surface 72 of the vertical wall 61 when the risers 22 are in a stacked condition. In a stacked condition, the horizontal surface 72 at the bottom lower edge 56 engages with the grooves 68 smashing or crushing the micro-ridges of the grooves to form a seal around the connection of adjacent risers 24.

L-shape slots 52 are spaced apart around the bottom end of riser 24. The slots engage tabs 54 which are correspondingly spaced apart around the circumference of the top end of adaptor 22. As shown in FIGS. 5A, 6A, 7 and 8A, the tabs 54 are spaced apart around the inner surface of the upper edge 58 of the riser. Each tab 54 has a horizontal length which is less than the dimension of the horizontal part of the opening of its mating slot 52. A typical mating slot 52 includes a horizontally extending channel 52a which connects with an upper end of an open vertically running channel 52b. The channel 52b is longer than the horizontally extending length of the locking tab 54. The horizontally extending channel 52a is slightly greater in the vertical dimension than the width or vertical dimension of the tab 54. The locking tab 54 is also provided with a nesting recess 54a which engages with a nesting finger 52c which is disposed at a preselected position along the length of the inner surface of the channel 52a.

Figure 6A:
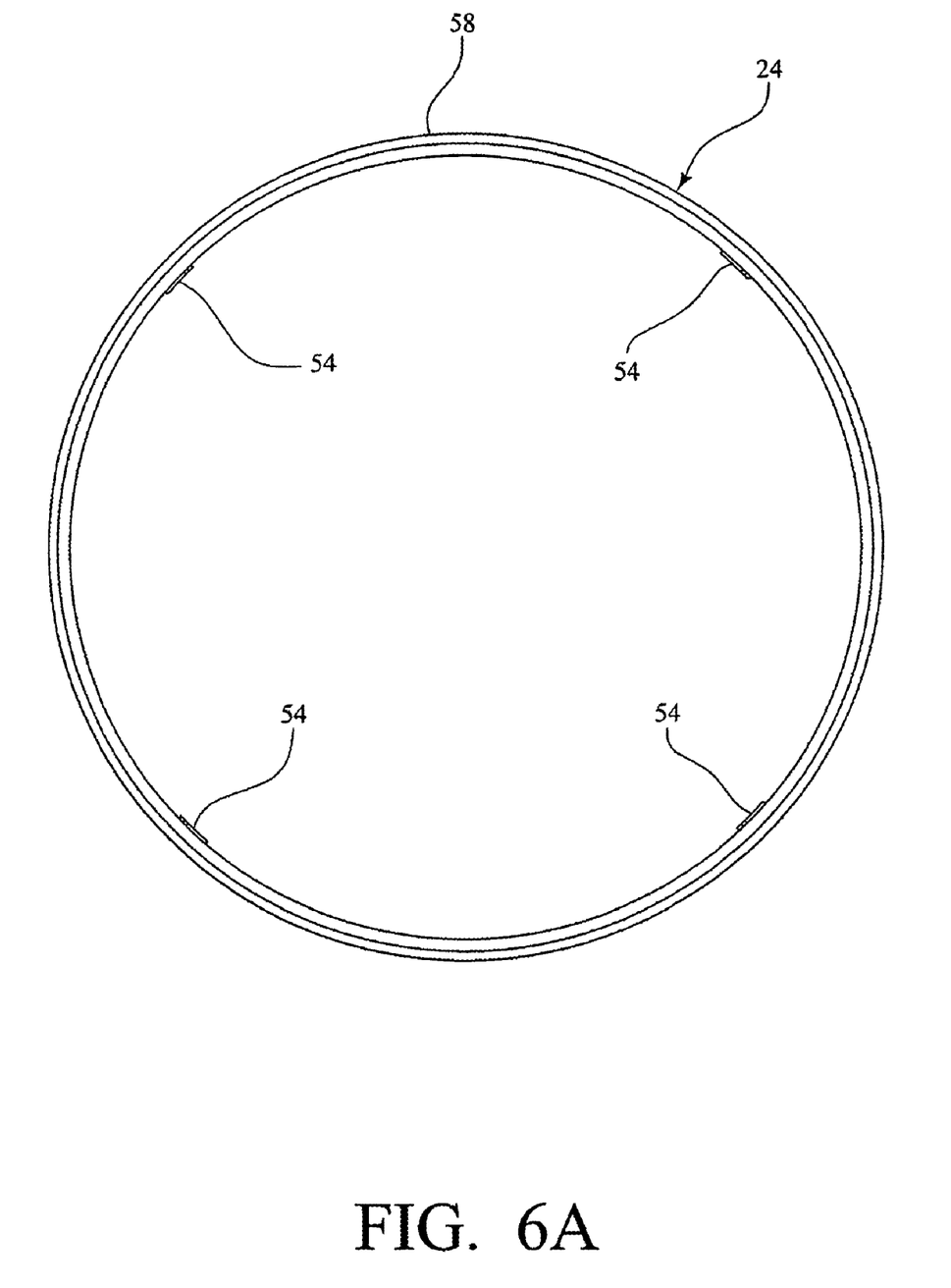
FIG. 6A is a top view of a riser of the present invention.
Figures 6B, 7:
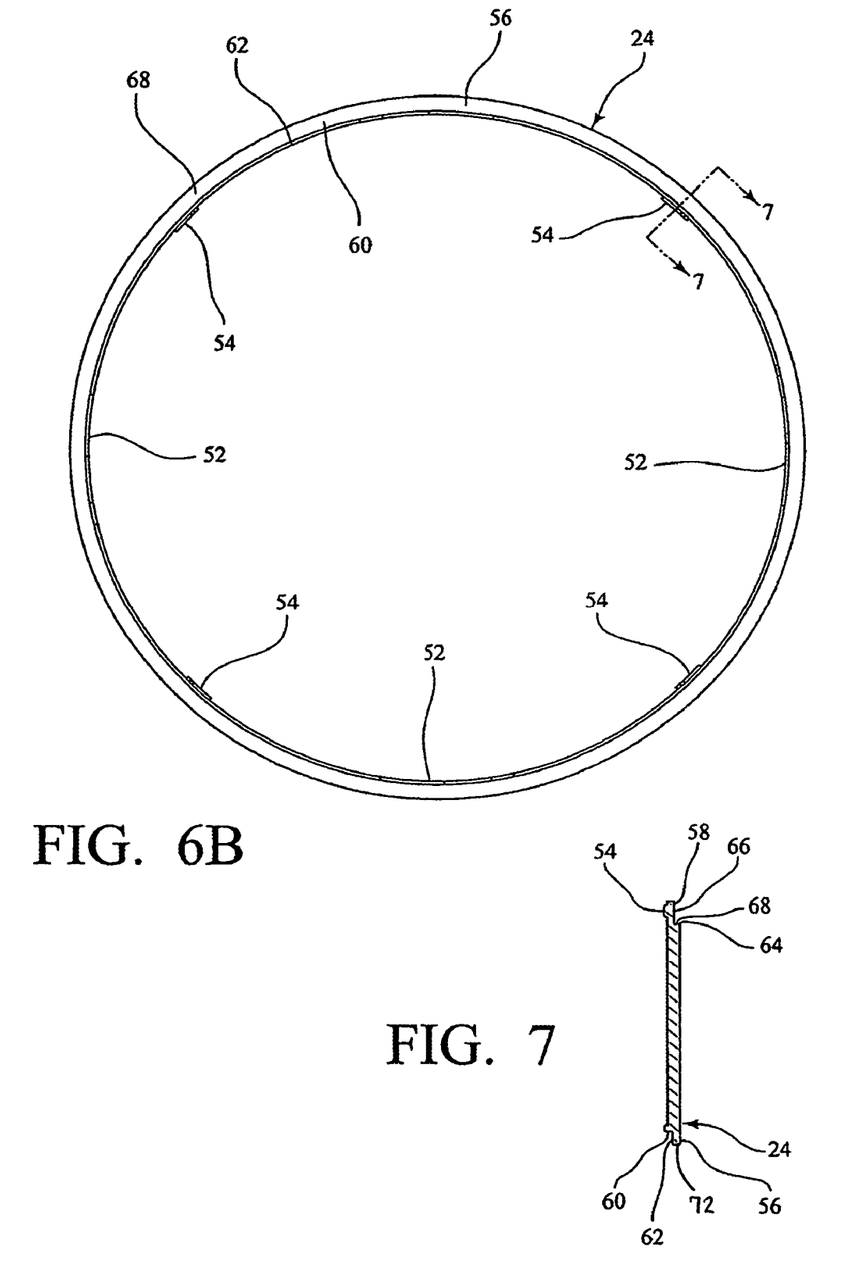
FIG. 6B is a bottom view of the riser of FIG. 6A.
FIG. 7 is a cross-sectional view of the riser of FIG. 6B taken through a plane passing through line 7-7 of FIG. 6B.

As shown in FIG. 7, the upper end of the riser 24 has the same features as characterize the upper end of the adapter, for receiving another riser illustrated in FIG. 1, or for receiving a lid 26, as shown in FIG. 1 and FIG. 5A.

Figure 8A:
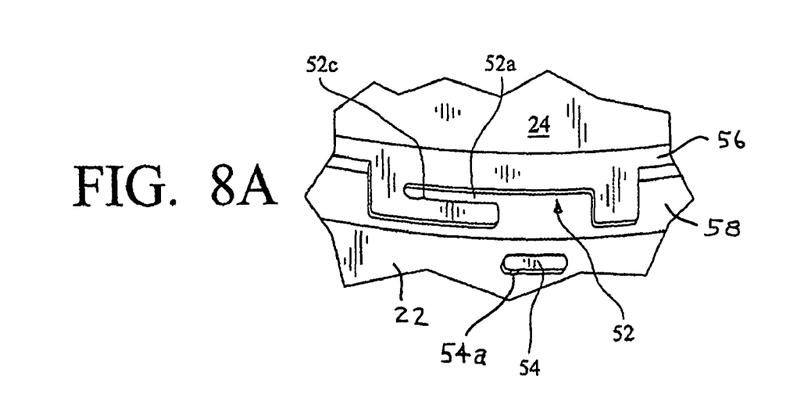
FIGS. 8A, 8B, and 8C show partial views of the connecting steps in connecting adjacent risers of the present invention.
Figure 8B:
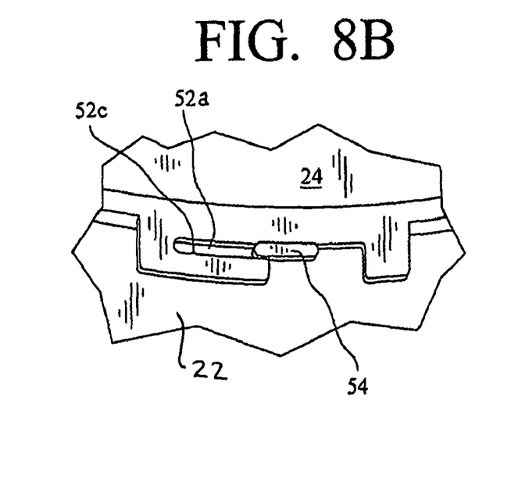
Figure 8C:
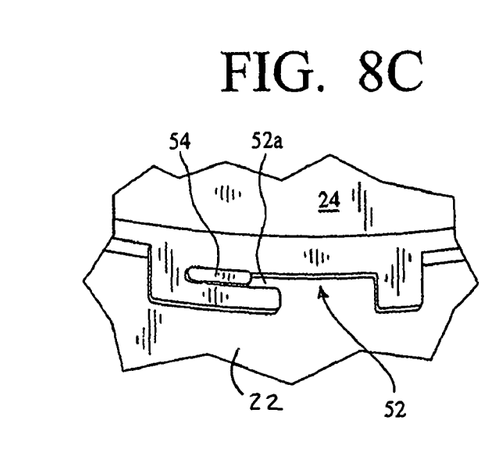

As shown in the sequence FIGS. 8A, 8B, 8C, the risers 24 are easily mounted one to the other by inserting the tab 54 into the open channel 52b of the slot 52. The riser 24 is then rotated so that the tab 54 slides into the closed portion or horizontally extending channel 52a of the slot 52. The tab 54 is slid along the channel 52a until the nesting recess 54a is engaged with the nesting finger 52c. Thus, the edges of the stacked risers 24 are in an abutting edge-to-edge relationship and these edges are held in engagement by the tab and slot structure.

The foregoing detail description is given primarily for clearness of understanding and no unnecessary limitations are to be understood therefrom and modifications will become obvious to those skilled in the art upon reading this disclosure and may be made without departing from the spirit of the invention and scope of the appended claims.

What is claimed is:

1. A riser system for mounting vertically on an access opening at the top of a wastewater treatment tank comprising:
   an adaptor ring, for affixing to the top of a tank, and for receiving a riser or a lid, having an upper end comprising a circumscribing L-shape surface, wherein a first portion of the surface runs horizontally and circumferentially and a second portion runs circumferentially and vertically, plurality of tabs spaced apart around the circumference of the upper end, and a lower end, for affixing to the top of a wastewater treatment tank; and,
   a riser, for mounting on the adaptor ring or on another like riser, having an upper end comprising a circumscribing L-shape surface, wherein a first portion of the surface runs horizontally and circumferentially and a second portion runs circumferentially and vertically, a plurality of tabs spaced apart around the circumference of the upper end; a lower end having a circumscribing L-shape surface, wherein a first portion of the surface runs horizontally and circumferentially and a second portion runs circumferentially and vertically, and a plurality of L-shape slots spaced apart around the circumference of the lower end, each slot having an open lower end which runs vertically and an upper end which runs circumferentially;
   wherein said slots are spaced apart and shaped for receiving said tabs, so that each tab is moveable vertically and then horizontally within the slot in which it is received, when the riser and adaptor ring are mated, and, when two like risers are mated; and,
   wherein at least one of said circumferential running portions of at least one of said circumscribing L-shape surfaces has micro-grooves.

2. The system of claim 1 wherein each slot has a feature in the circumferentially and horizontally running portion of the slot, the feature shaped to engage a tab when it is moved circumferentially to the location of the feature, to thereby resist reverse motion of the tab within said portion of the slot.

3. The system of claim 1 further comprising a second riser like the first riser, mounted on the first riser.

4. The system of claim 1 further comprising a lid having a lower end configured like the lower end of the riser, mounted on the upper end of the riser.

5. The system of claim 1 wherein the adaptor ring lower end has means for engaging concrete poured around the lower end, to thereby affix the adaptor ring to the tank.

6. Apparatus for treating wastewater which includes a wastewater treatment tank, wherein the riser system of claim 1 is attached to the top of the tank.

7. A riser for placement vertically above the access opening at the top of a wastewater treatment tank, for mounting on a like riser, comprising:
   an upper end having a circumscribing L-shape surface, wherein a first portion of the surface runs horizontally and circumferentially and a second portion runs circumferentially and vertically, and a plurality of tabs spaced apart around the circumference of the upper end; and,
   a lower end having a circumscribing L-shape surface, wherein a first portion of the surface runs horizontally and circumferentially and a second portion runs circumferentially and vertically, and a plurality of L-shape slots spaced apart around the circumference of the lower end, each slot having an open lower end which runs vertically and an upper end which runs circumferentially;
   wherein said plurality of slots is shaped and spaced apart for receiving the plurality of tabs of a like riser, so that each tab is moveable vertically and then horizontally within the slot in which it is received, when two like risers are mated; and,
   wherein at least one of said circumferential running portions of at least of said circumscribing L-shape surfaces has micro-grooves.

8. A riser for placement vertically above the access opening at the top of a wastewater treatment tank comprising:
   an upper end having a circumscribing L-shape surface, wherein a first portion of the surface runs circumferentially and a second portion runs vertically, and a plurality of tabs spaced apart around the circumference of the upper end; and,
   a lower end having a plurality of L-shape slots spaced apart around the circumference of the lower end, each slot having an open lower end which runs vertically and an upper end which runs circumferentially; wherein said slots are spaced apart and shaped for receiving the tabs of a like riser, so that each tab is moveable vertically and then circumferentially within the slot in which it is received, when two like risers are mated;
   wherein each slot has a feature in the slot portion which runs circumferentially, the feature shaped to engage a tab which is moved circumferentially to the location of the feature when two like risers are mated, to thereby resist reverse motion of the tab within the slot; and,
   wherein at least one of said circumferential running portions of at least one of said circumscribing L-shape surfaces has micro-grooves.

\* \* \* \* \*